(12) United States Patent
Donohoe

(10) Patent No.: US 8,944,486 B2
(45) Date of Patent: Feb. 3, 2015

(54) VEHICLE TOP

(71) Applicant: Gregory Donohoe, Tempe, AZ (US)

(72) Inventor: Gregory Donohoe, Tempe, AZ (US)

( * ) Notice: Subject to any disclaimer, the term of this patent is extended or adjusted under 35 U.S.C. 154(b) by 0 days.

(21) Appl. No.: 14/027,231

(22) Filed: Sep. 15, 2013

(65) Prior Publication Data

US 2014/0077521 A1    Mar. 20, 2014

Related U.S. Application Data

(60) Provisional application No. 61/703,043, filed on Sep. 19, 2012.

(51) Int. Cl.
  *B60J 7/11* (2006.01)
  *B60J 11/04* (2006.01)
  *B60J 7/10* (2006.01)
  *B62D 33/04* (2006.01)

(52) U.S. Cl.
  CPC .. *B60J 11/04* (2013.01); *B60J 7/10* (2013.01); *B62D 33/04* (2013.01)
  USPC .................. 296/102; 296/136.03; 296/136.12

(58) Field of Classification Search
  CPC ............... B60J 7/08; B60J 7/085; B60J 7/10; B60J 7/102; B60J 7/104; B60J 7/11
  USPC ............ 296/102, 103, 136.03, 136.1, 136.12, 296/218
  See application file for complete search history.

(56) References Cited

U.S. PATENT DOCUMENTS

| | | | | |
|---|---|---|---|---|
| 2,463,646 A | * | 3/1949 | Schassberger | 296/104 |
| D153,858 S | * | 5/1949 | Cosner | D12/405 |
| D155,614 S | * | 10/1949 | Klein et al. | D12/405 |
| 2,665,165 A | * | 1/1954 | Pitman | 296/193.12 |
| 2,682,427 A | * | 6/1954 | Bright | 296/148 |
| 2,846,262 A | * | 8/1958 | Ray | 296/161 |
| 2,848,274 A | * | 8/1958 | Geisler et al. | 296/102 |
| 3,009,212 A | * | 11/1961 | Makens | 52/66 |
| 3,489,453 A | * | 1/1970 | Rodgers | 296/164 |
| 3,524,674 A | * | 8/1970 | Medeiros | 296/102 |
| RE28,876 E | * | 6/1976 | Notestine et al. | 280/756 |
| 4,679,847 A | * | 7/1987 | Dirck | 296/218 |
| 4,733,902 A | * | 3/1988 | Rabb | 296/39.3 |
| 5,259,656 A | * | 11/1993 | Carroll | 296/77.1 |
| 5,423,587 A | * | 6/1995 | Ingram | 296/3 |
| 5,458,390 A | * | 10/1995 | Gilbert | 296/78.1 |
| 5,556,156 A | * | 9/1996 | Kirk | 296/100.15 |
| 5,673,959 A | * | 10/1997 | Padlo | 296/116 |
| 5,803,529 A | * | 9/1998 | Perry-Bores et al. | 296/107.09 |
| 5,947,546 A | * | 9/1999 | Hilliard et al. | 296/107.11 |
| 6,036,256 A | * | 3/2000 | Hilliard et al. | 296/148 |
| 6,206,454 B1 | * | 3/2001 | Cory | 296/146.2 |
| 6,286,888 B1 | * | 9/2001 | Essig | 296/102 |
| 6,295,713 B1 | * | 10/2001 | Hilliard et al. | 29/446 |
| 6,505,880 B1 | * | 1/2003 | Castro | 296/102 |
| 6,616,212 B1 | * | 9/2003 | Bishop | 296/100.18 |

(Continued)

*Primary Examiner* — Gregory Blankenship

(57) ABSTRACT

This invention includes a soft-top mounted on a jeep-type SUV. First, a structural support is used to support the soft-top. The structural support includes at least two rails, mounting brackets, pillars attached to the rails, cross bars attached to the pillars, and bows to form a front and rear structural support. Next, the soft-top is attached to the outside of the support structure. The soft-top is made with several panels attached together with zippers, and straps and buckles used to firmly secure the soft-top to the support structure. The use of several panels and zippers enable a soft-top that can be changed into several different configurations to meet different looks, functions, or weather conditions.

16 Claims, 14 Drawing Sheets

(56) References Cited

U.S. PATENT DOCUMENTS

| | | | |
|---|---|---|---|
| 6,811,204 B2 * | 11/2004 | Long | 296/102 |
| 6,824,192 B2 * | 11/2004 | Hoffmann | 296/100.18 |
| 6,827,391 B1 * | 12/2004 | Kohn et al. | 296/146.14 |
| 6,851,739 B2 * | 2/2005 | Morley | 296/102 |
| 6,908,107 B2 * | 6/2005 | Barth | 280/756 |
| 6,921,077 B1 * | 7/2005 | Pupo | 296/102 |
| 7,025,404 B1 * | 4/2006 | Gilbert | 296/102 |
| 7,118,160 B2 * | 10/2006 | Willard | 296/107.01 |
| 7,128,364 B2 * | 10/2006 | Stabile, Jr. | 296/159 |
| 7,213,866 B2 * | 5/2007 | Metts et al. | 296/102 |
| 7,523,977 B2 * | 4/2009 | Fallis et al. | 296/118 |
| 7,540,555 B2 * | 6/2009 | Stabile, Jr. | 296/159 |
| 7,828,364 B2 * | 11/2010 | Causey | 296/136.12 |
| 8,622,457 B1 * | 1/2014 | McIntire | 296/102 |
| 2003/0102698 A1 * | 6/2003 | Stevens et al. | 296/225 |
| 2003/0168880 A1 * | 9/2003 | Burkel et al. | 296/103 |
| 2007/0018485 A1 * | 1/2007 | Jacobson | 296/210 |
| 2011/0101056 A1 * | 5/2011 | Barkey | 224/321 |
| 2014/0077521 A1 * | 3/2014 | Donohoe | 296/136.03 |

* cited by examiner a)

b)

a)

b)

a)

b)

a)

b)

15000 Configuration 5

15100 Structural Support

VEHICLE TOP

CROSS-REFERENCE TO RELATED APPLICATIONS

The present application is related to and claims priority from prior provisional application Ser. No. 61/703,043 filed Sep. 19, 2012 the contents of which are incorporated herein by reference.

FIELD OF THE INVENTION

This invention is in the field of vehicle hardware, and in particular a top for a vehicle, such as a soft top for a jeep-type SUV.

BACKGROUND OF THE INVENTION

Vehicles, including four-wheel drive vehicles, have played important roles in human lives since the invention of the motorized vehicle. Various forms of four-wheel drive vehicles, such as jeep-type sports utility vehicles ("SUV's") are used every day for recreation and work in just about every society throughout the world. A huge need and market has arisen allowing the owners of such vehicles to customize and enhance the performance of their vehicles. This is especially so for four-wheel drive vehicles, such a jeep-type SUV's.

The basic design of a jeep-type SUV consists of a frame, exterior, power train, electrical system, interior, and a roof. Though, these vehicles are generally sold with these basic components, a secondary market has developed to meet the strong demand of owners to modify these components to meet their specific needs. For example, most jeep-type SUV's are sold with replaceable roofs, such as hard and soft tops. There are many replaceable hard and soft tops on the market but none satisfy the need for a ruggedized, multi-configurable, soft top that is aesthetically pleasing.

This invention provides a novel solution for a ruggedized, multi-configurable, soft top that is aesthetically pleasing. This invention includes a supporting structure and soft-top for jeep-type SUV's.

BRIEF SUMMARY OF THE INVENTION

This invention includes a soft-top mounted on a jeep-type SUV. The soft-top includes a square window on each side of the jeep-type SUV that are substantially rectangular including sharp corners. Next, a structural support is used to support the soft-top. The structural support includes at least two rails. The rails include mounting holes that are used to mate the structural support to the jeep-type SUV. The rails are designed in such a way as to allow the structural support to mount to the jeep-type SUV using the existing mounting holes provided in the jeep-type SUV. The rails also include mounting brackets that further facilitate mounting to the jeep-type SUV. Next, pillars are attached to the rails. At least two pillars are attached near the ends of the each rail. Next, cross bars are attached to the pillars connecting the pillars mounted at each end of each rail, thus forming a left wall and right wall. Next, bows are attached to the cross bars, thus connecting the left wall and right wall. Next, there is a front structural support that is used to extend the structural support to the front compartment of the jeep-type SUV. The structural supports are designed to increase the interior volume of the jeep-type vehicle.

Next, the soft-top is attached to the outside of the support structure. The soft-top is made with several panels attached together with zippers, and straps and buckles used to firmly secure the soft-top to the support structure. The use of several panels and zippers enable a soft-top that can be changed into several different configurations to meet different looks, functions, or weather conditions.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

It is common in the jeep-type SUV market for owners to purchase additional tops to either replace broken tops or to improve the performance or appearance of their jeep-type SUV. However, existing tops on the market have limited physical appeal and do not provide the rugged appearance demanded by enthusiasts in this market.

Figure 1:
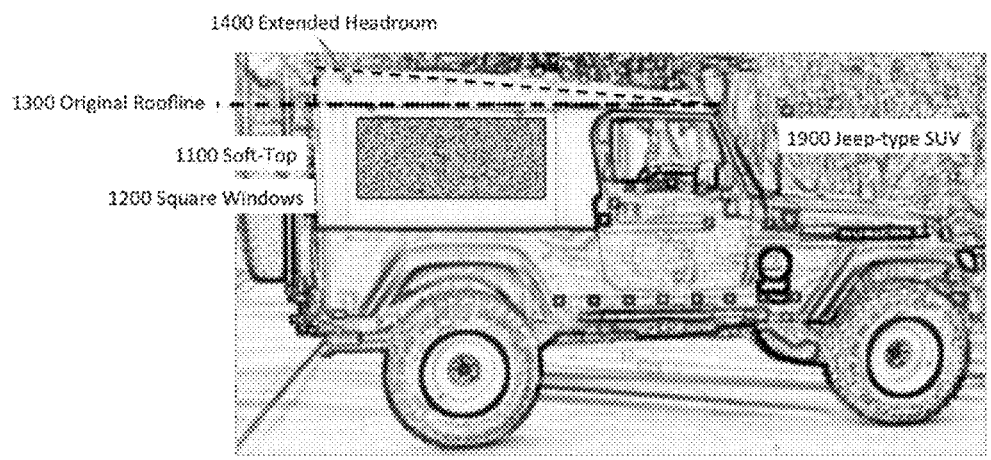
FIG. 1 is a figure illustrating the front, side, rear, and angled view of the soft-top in accordance with the teachings of the present invention.
Figure 1:
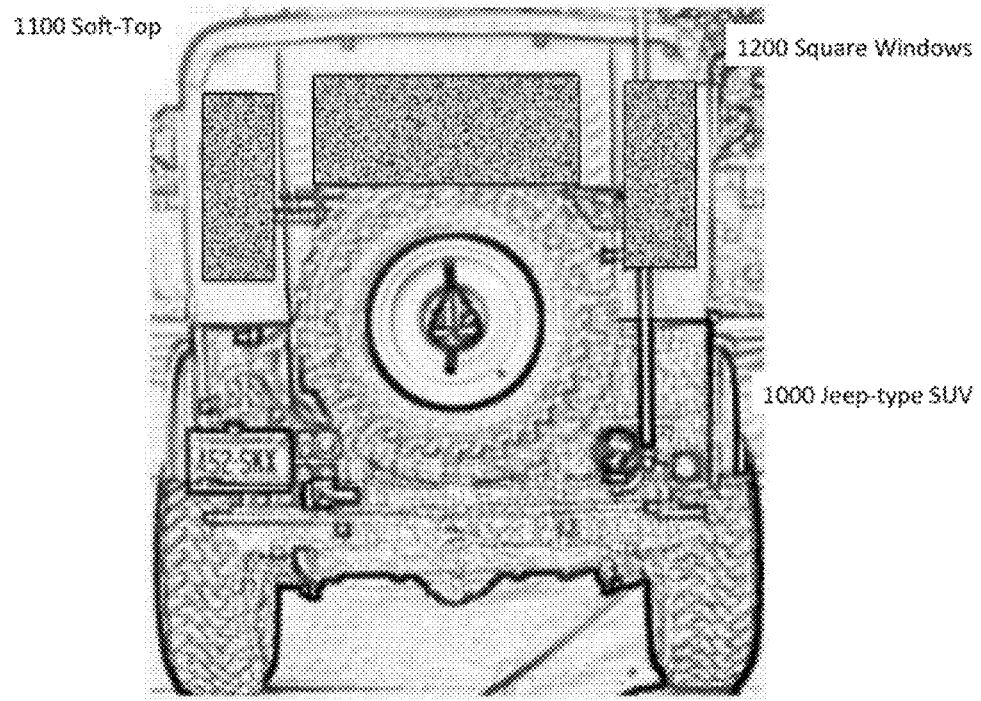

FIG. 1 illustrates an embodiment of the invention including the soft-top 1100 mounted on a jeep-type SUV 1000. FIG. 1 *a*) illustrates a side view of the soft-top 1100 including a square window 1200 on each side of the jeep-type SUV 1000 that are substantially rectangular including sharp corners. FIG. 1 *b*) illustrates a rear view of the jeep-type SUV 1000 with the soft-top 1100 including square windows 1200 at the rear of the jeep-type SUV 1000 that are substantially rectangular including sharp corners. The soft-top 1100 may be fabricated from any flexible fabric such as nylon, vinyl, or leather. The square windows 1200 may be fabricated from any type of clear or opaque materials.

Figure 2:
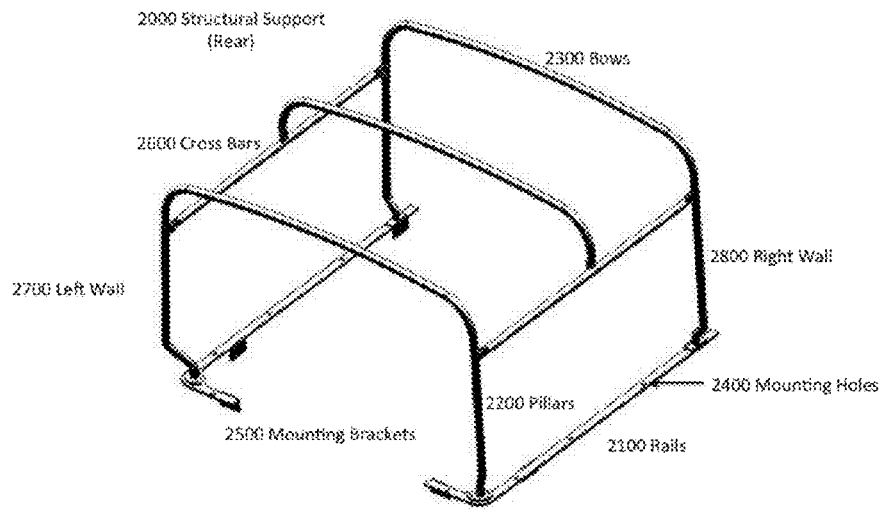
FIG. 2 is a figure of an exemplary embodiment illustrating the structural support system in accordance with the teachings of the present invention.
Figure 2:
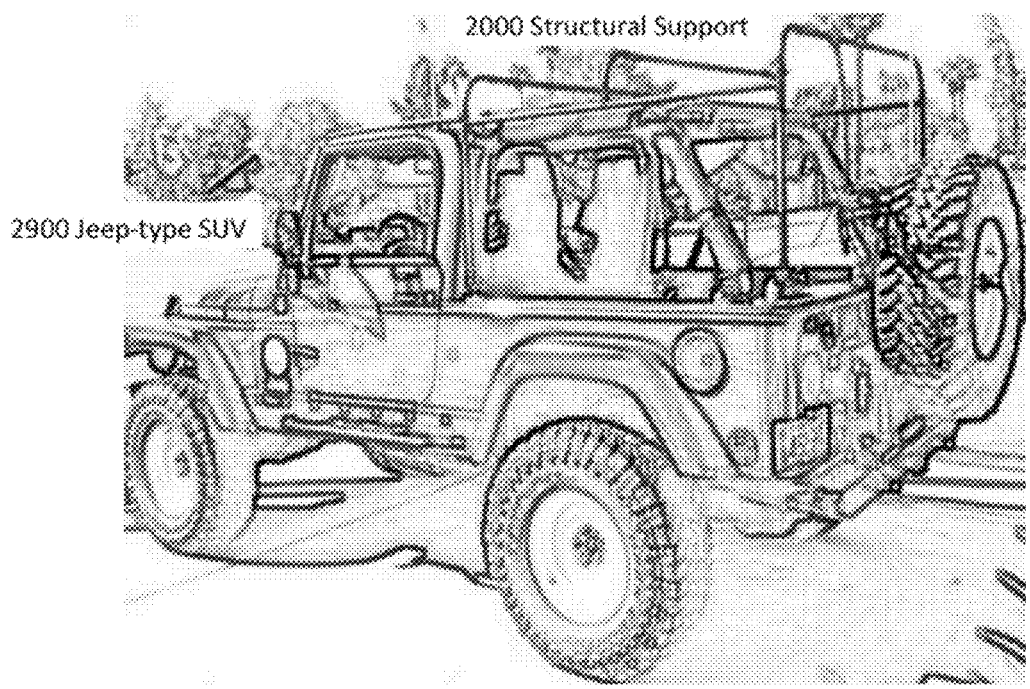

FIG. 2 illustrates the structural support 2000 used to support the soft-top 1100 (ref to FIG. 1). The structural support includes at least two rails 2100. The rails 2100 include mounting holes 2400 that are used to mate the structural support to the jeep-type SUV 2900. The rails 2100 are designed in such a way as to allow the structural support 2000 to mount to the jeep-type SUV 2900 using the existing mounting holes provided in the jeep-type SUV 2900. The rails 2100 also include mounting brackets 2500 that further facilitate mounting to the jeep-type SUV 2900.

Next, pillars 2200 are attached to the rails 2100. At least two pillars 2200 are attached near the ends of the each rail. Next, cross bars 2600 are attached to the pillars 2200 connecting the pillars mounted at each end of each rail, thus forming a left wall 2700 and right wall 2800. Next, bows 2300 are attached to the cross bars 2600, thus connecting the left walls 2700 and right wall 2800. Any number of bows 2300 may be used to connect the left wall 2700 and right wall 2800. The bows 2300 provide the necessary strength to hold the structure together and to support any additional loads applied including roof racks. The bows 2300 are attach in a way which lends rigidity and strength to the soft-top 1100 (referring to FIG. 1), which allow a roof rack to be attached through the top corners rather than running additional pillars for support on the outside of the soft-top 1100 (referring to FIG. 1).

Figure 3:
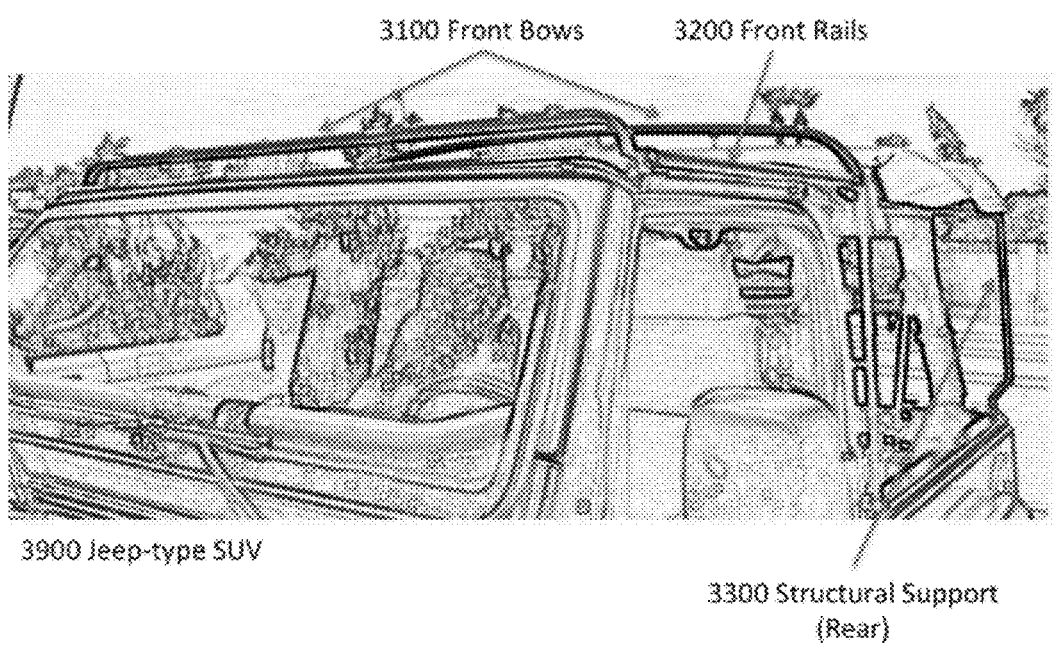
FIG. 3 is a figure of an exemplary embodiment illustrating the portion of the front structural support system that attaches to the front of the jeep-type SUV in accordance with the teachings of the present invention.
Figure 4:
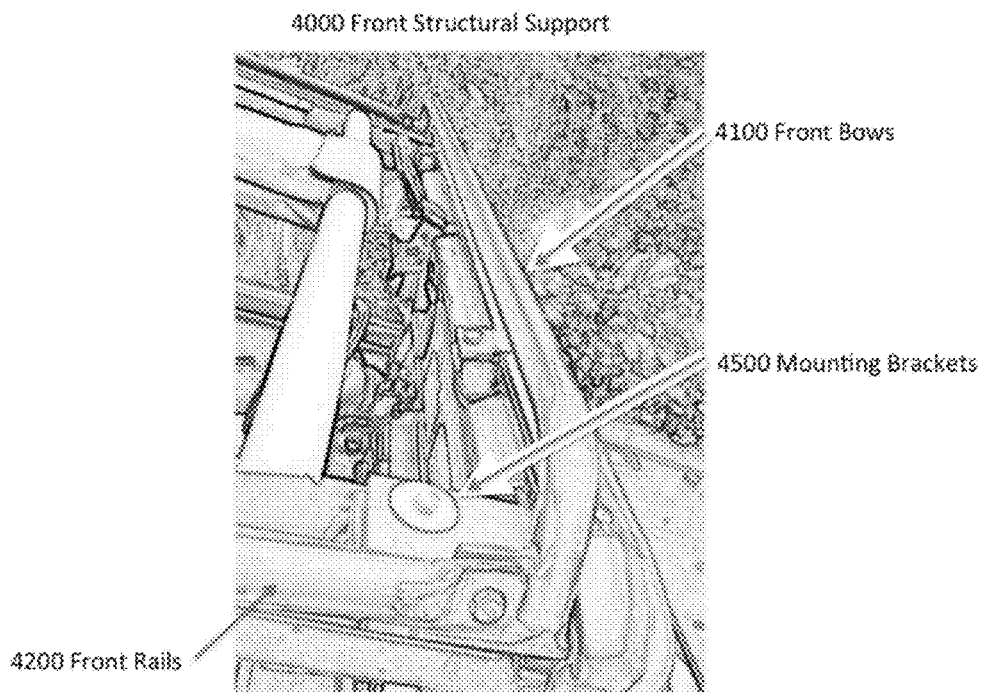
FIG. 4 is a figure of an exemplary embodiment illustrating close-up views of the front structural support system mounted to the jeep-type SUV in accordance with the teachings of the present invention.
Figure 5:
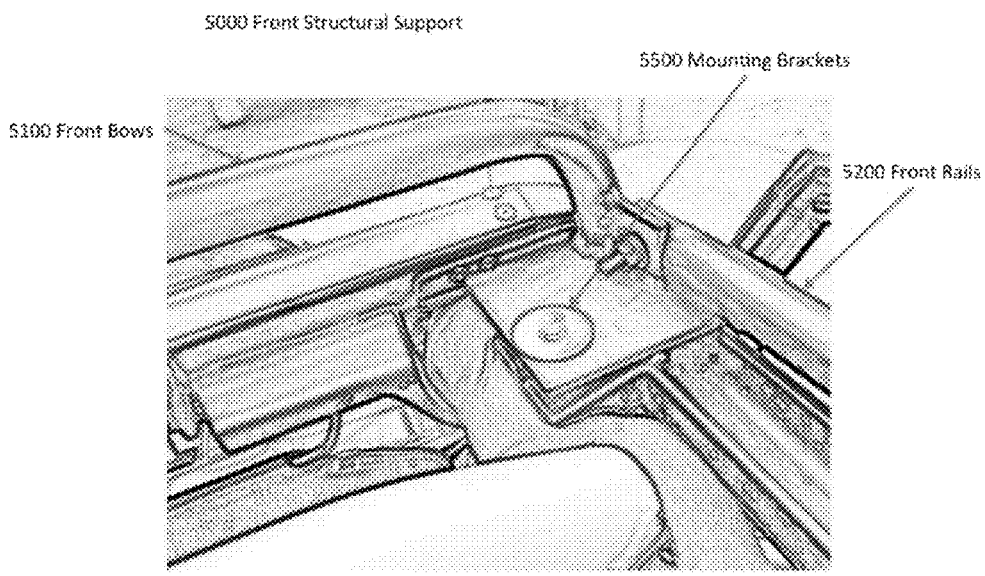
FIG. 5 is a figure of an exemplary embodiment illustrating close-up views of the front structural support system mounted to the jeep-type SUV in accordance with the teachings of the present invention.
Figure 6:
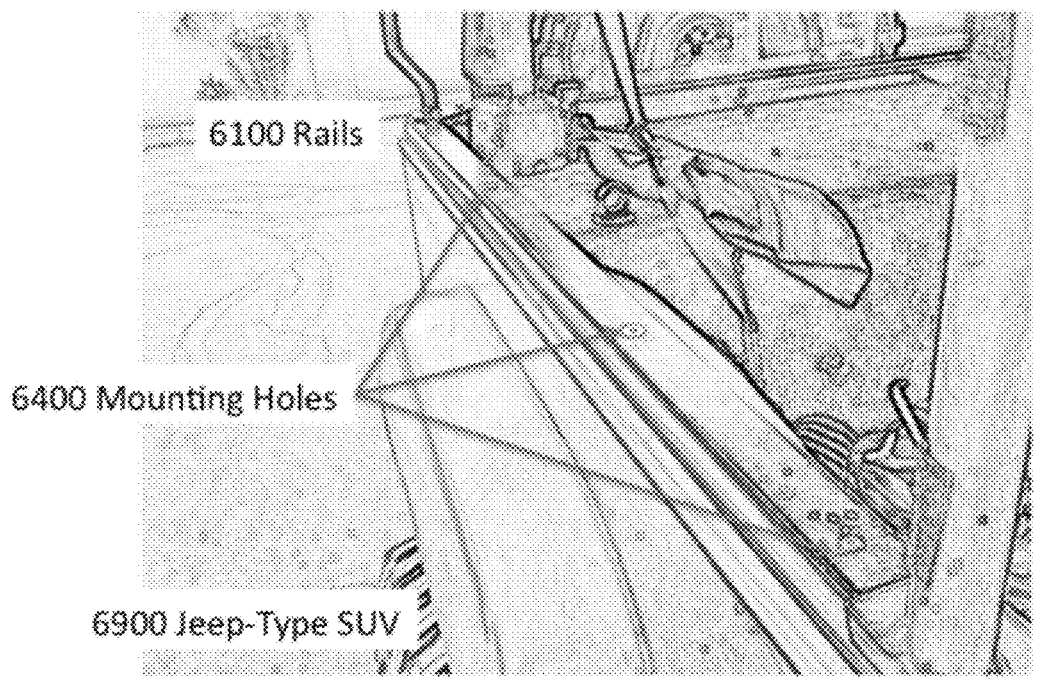
FIG. 6 is a figure of an exemplary embodiment illustrating close-up views of the rail and mounting holes used to mount to the jeep-type SUV in accordance with the teachings of the present invention.
Figure 7:
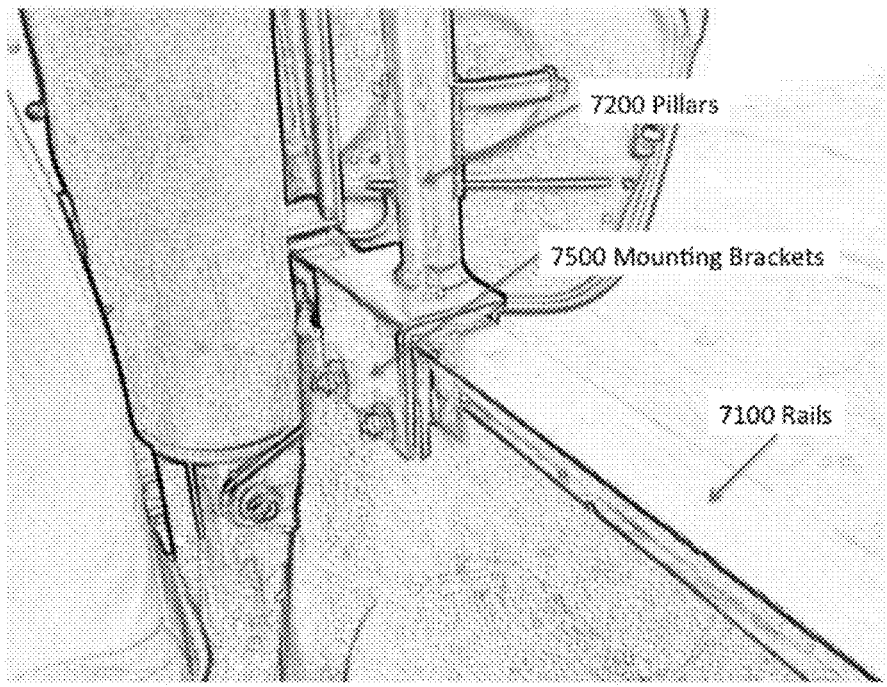
FIG. 7 is a figure of an exemplary embodiment illustrating close-up views of the rails, pillars, and mounting holes used to mount to the jeep-type SUV in accordance with the teachings of the present invention.
Figure 7:
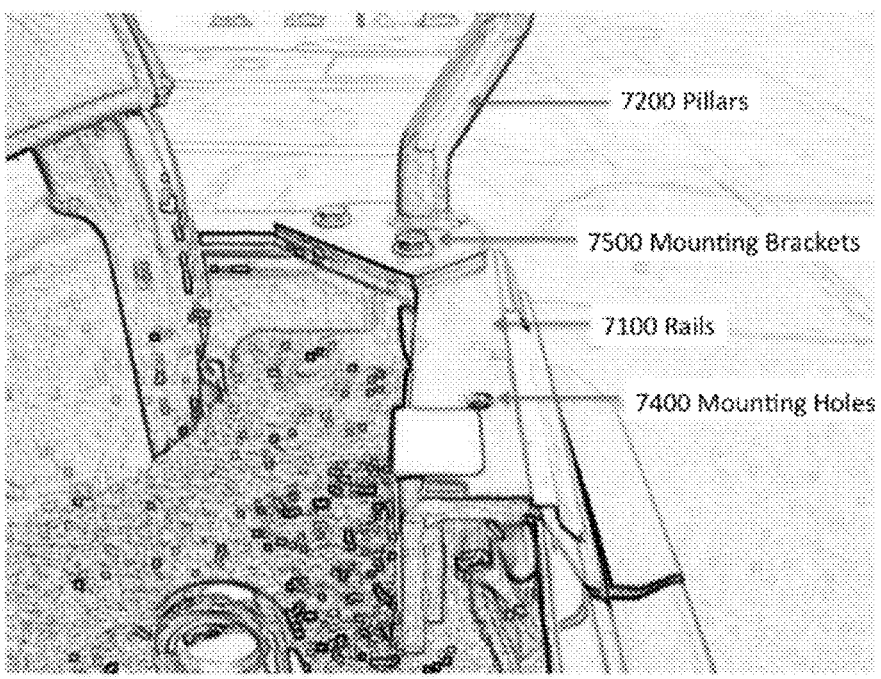

FIG. 3, FIG. 4, and FIG. 5 illustrate the front structural support 3000 which is used to extend the structural support to the front (i.e. driver compartment) end of the jeep-type SUV 3900. The front structural support 3000 includes at least front rails 3200. The front rails 3200 include mounting brackets 4500 (referring to FIG. 4) that are used to mate the front structural support 3000 to the jeep-type SUV 3900. The front rails 3200 are designed in such a way as to allow the front structural support 3000 to mount to the jeep-type SUV 3900 using the existing mounting holes provided in the jeep-type SUV 3900. Next, front bows 3100 are attached to the front rails 3200. Any number of front bows 3200 may be used to connect the front rails 3200 and provide the necessary strength to hold the structure together and to support any additional loads applied including luggage racks, etc.

The components comprising the structural support 2000 and front structural support 3000 are designed in such a way to provide the necessary support to withstand the loads and forces associated with the use of the soft-top and the jeep-type SUV 2100 and to avoid wear and tear. For example, the components may be fabricated from metal or other high strength materials such as carbon fiber. The geometry and size of the components is also optimized to provide the required structural integrity such as using steel or aluminum tubing. The components are attached to each other using one of several known methods for attaching such materials. For example, the components made of steel may be welded to each other, or held together using fasteners such as nuts and bolts. The component can further be customized and protected from external conditions (i.e. rain, sun, etc.) with paint or other coatings. This allows for greater customization to change the look of the jeep-type SUV quickly for both form and function.

In addition, the structural support 2000 is designed to increase the interior volume of the jeep-type vehicle 2900. For example, pillars 2200, bows 2300, and front bows 3100 (referring to FIG. 3) are shaped in manner to extend beyond the original roofline 1300 (referring to FIG. 1) of the jeep-type SUV 2900. For example, FIG. 2 *b*) and FIG. 3 show that the bows 2200 and front bows 3100 extend above the original roofline of the jeep. The pillars 2200 are also designed to increase the interior volume of the vehicle by extending outside of the side of the jeep-type SUV to provide substantially vertical walls relative to the jeep-type SUV—instead of angling inwards. This has the effect of increasing the headroom of the vehicle by several inches. FIG. 1 *a*) illustrates the extended headroom 1400 created by extending the support structures beyond the original roofline 1300. The increased heard room enables the use of a larger roll cage which can be safer in a rollover accident.

Figure 8:
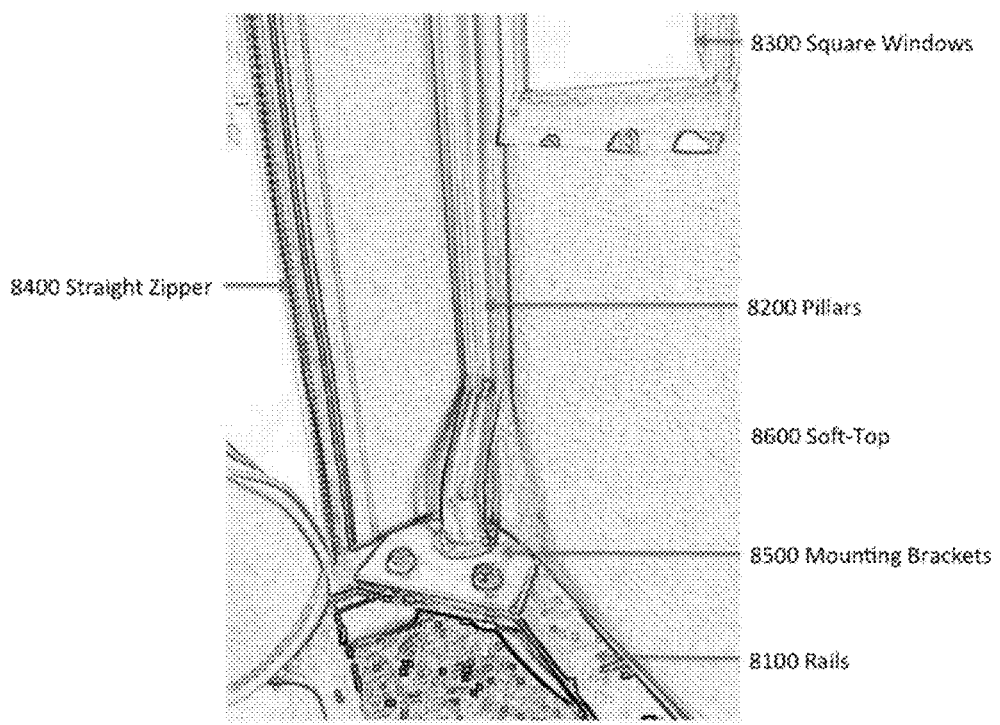
FIG. 8 is a figure of an exemplary embodiment illustrating close-up views of the rails, pillars, mounting holes, and soft-top used to mount to the jeep-type SUV in accordance with the teachings of the present invention.
Figure 9:
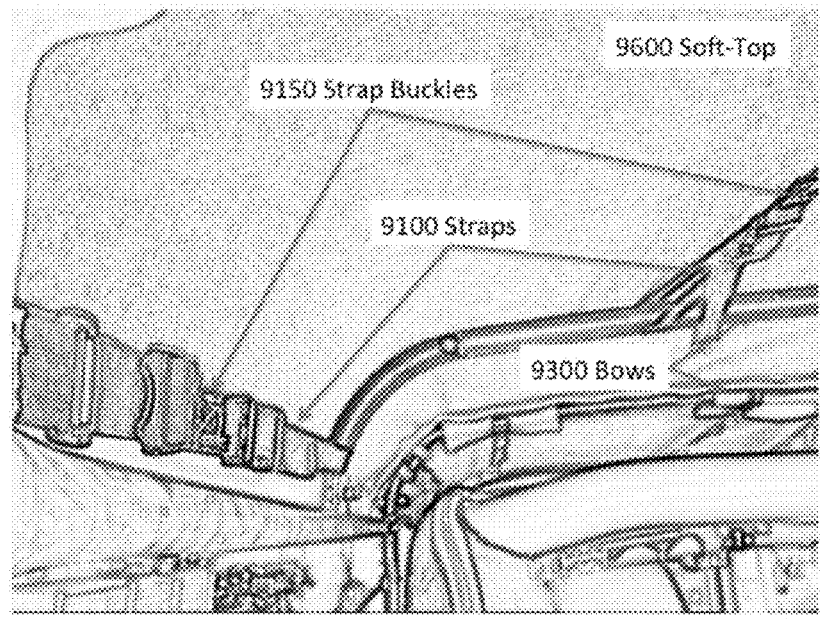
FIG. 9 is a figure of an exemplary embodiment illustrating the strapping system used to attach the soft-top to the structural support system in accordance with the teachings of the present invention.
Figure 9:
Figure 10:
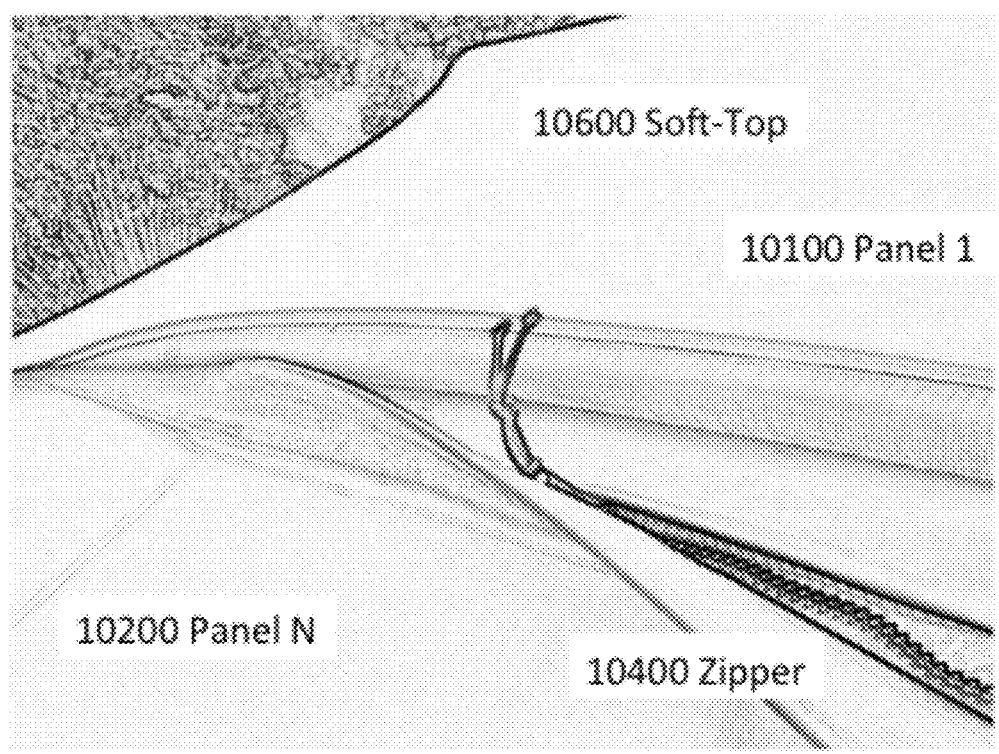
FIG. 10 is a figure of an exemplary embodiment illustrating the panels and zippers used to form the soft-top in accordance with the teachings of the present invention.

FIG. 8 shows how the soft-top 8600 is attached to the outside of the support structure. Furthermore, FIG. 10 illustrates how the soft-top 10600 is made with several panels (such as panel 1 10100 and panel N 10200), which are attached together with zippers 10400. The zippers 10400 are designed and attached to the panels in a way to avoid 90 degree turns—thus avoiding breakage or sticking common with zippers that have to travers 90 degree turns. FIG. 9 shows how straps 9100 are attached to the soft-top 9600. The straps 9100 are attached to the soft-top 9600 by any suitable means such as stitched, riveted, or glued with an adhesive. The straps 9100 also include various strap buckles 9150. The strap buckles 9150 are designed in a way to allow one end of the strap 9100 to wrap around the bows 9300 and tighten the strap 9100 to firmly secure the soft-top 9600 to the support structure.

Figure 14:
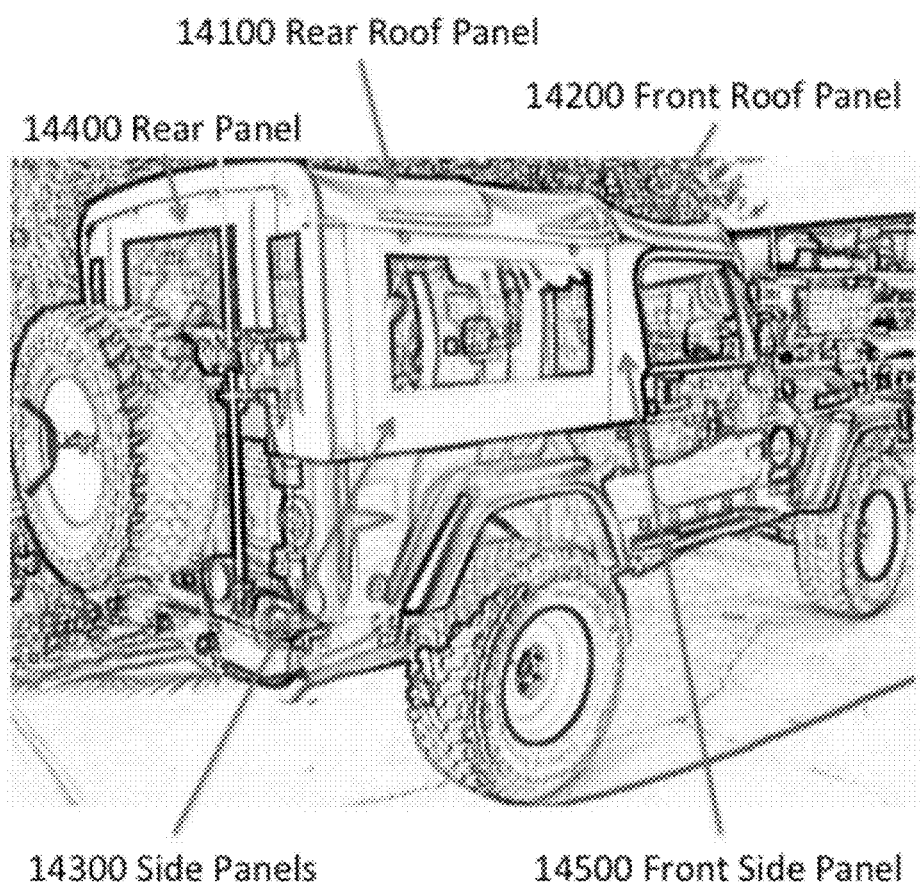
FIG. 14 is a figure of an exemplary embodiment illustrating the various configurations of the multi-configurable soft-top in accordance with the teachings of the present invention.

The use of several panels and zippers enable a soft-top that can be changed into several different configurations to meet different looks, functions, or weather conditions. For example, FIG. 14 illustrates the soft-top with all of the panels including the rear roof panel 14100, front roof panel 14200, two front side panels 14500, two side panels 14300, and rear panel 14400 attached to enclose the entire interior compartment of the jeep-type SUV. The front side panels 14500 gradually go from vertical to slanted to follow the shape of the factory doors.

Figure 11:
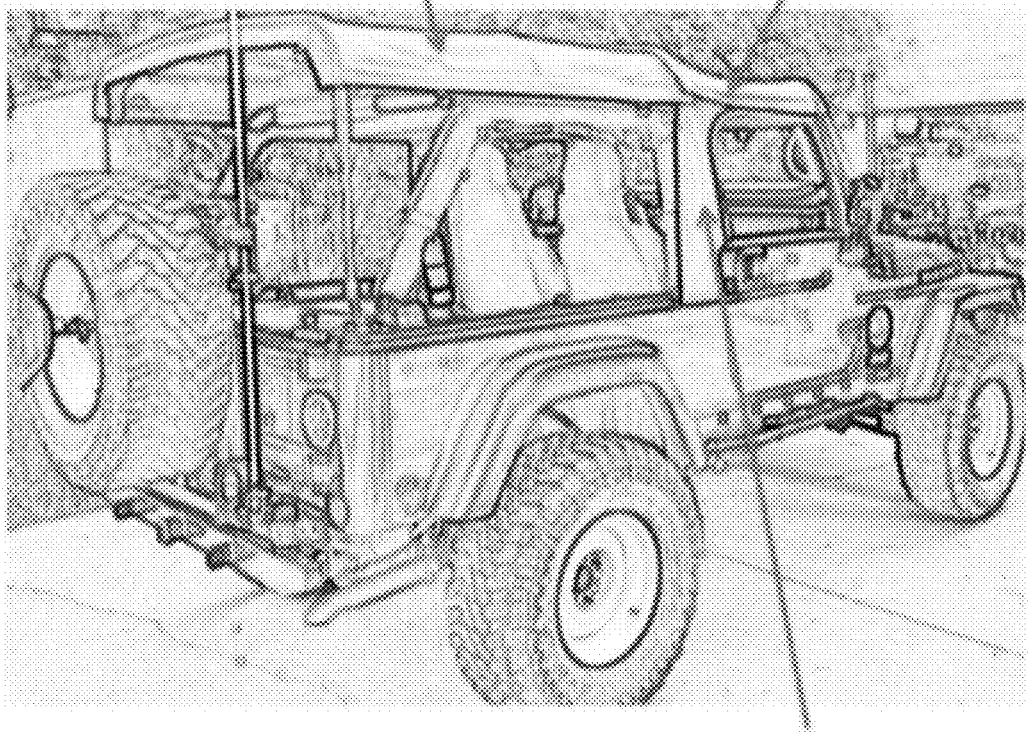
FIG. 11 is a figure of an exemplary embodiment illustrating the various configurations of the multi-configurable soft-top in accordance with the teachings of the present invention.
Figure 12:
FIG. 12 is a figure of an exemplary embodiment illustrating the various configurations of the multi-configurable soft-top in accordance with the teachings of the present invention.
Figure 13:
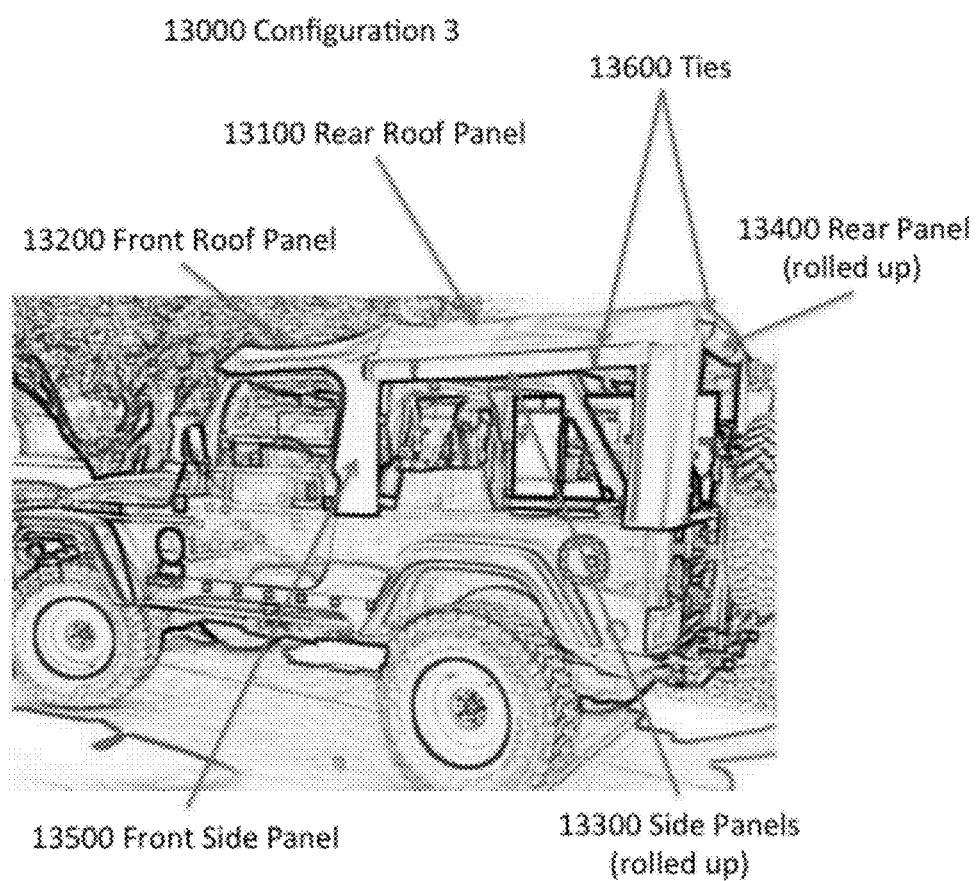
FIG. 13 is a figure of an exemplary embodiment illustrating the various configurations of the multi-configurable soft-top in accordance with the teachings of the present invention.
Figure 15:
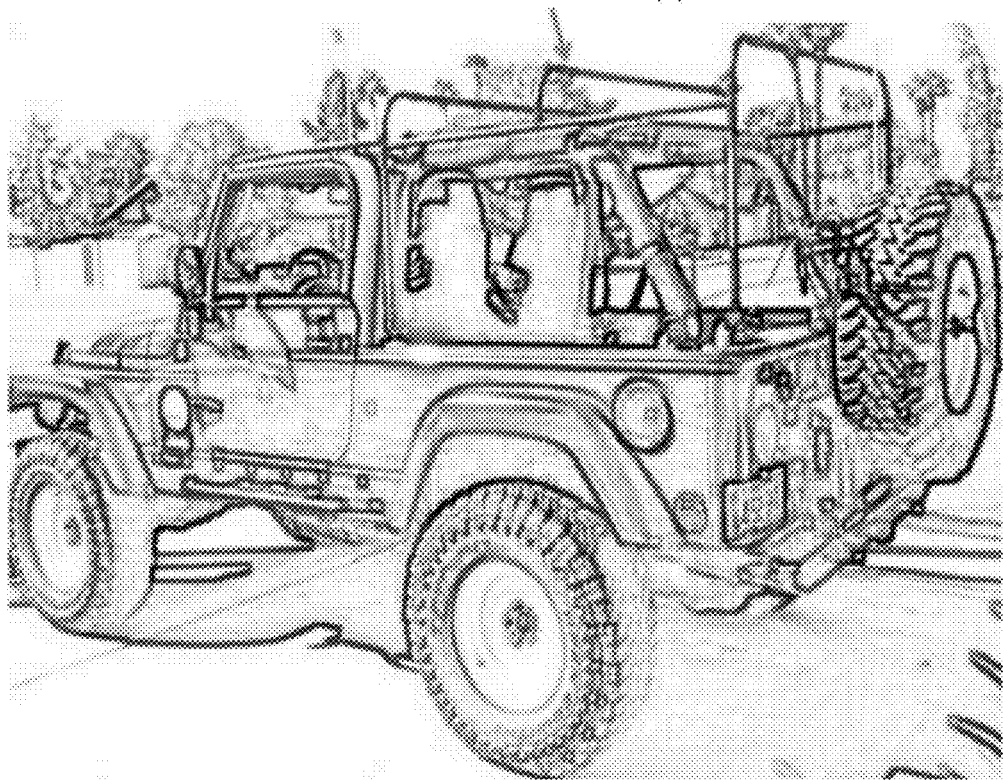
FIG. 15 is a figure of an exemplary embodiment illustrating the various configurations of the multi-configurable soft-top in accordance with the teachings of the present invention.

FIG. 11 illustrates the soft-top with the two side and rear panels completely removed and only the rear roof panel 11100 and front compartment panel 11200 attached to create a "safari" configuration. Next, FIG. 12 illustrates the soft-top with most panels removed, except the front top panel 12200 to provide a "bikini" configuration. The front roof cover 14200 (referring to FIG. 14) and rear roof panel 14100 (referring to FIG. 14) over the front passenger and rear passenger compartments can zip apart, instead of having to install two different tops for these configurations, which is not like currently available soft-tops. FIG. 13 shows the two side panels 14300 and rear panel 13400 unzipped and rolled up, but not completely removed from the soft-top. Instead these panels are rolled up and held up using ties 13600, such as straps or velcro. FIG. 15 illustrates the configuration where all of the panels are removed and only the structural support 15100 is installed.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A device including a removable top cover for mounting on a SUV equipped with a removable top comprising:
    the removable top cover attached to a support structure;
    the support structure comprising,
        a left rail, and a right rail;
        a pillar attached to each end of the left rail, and a pillar attached to each end of the right rail;
        a cross bar attached to the pillars attached to each end of the left rail, connecting the pillars mounted at each end of the left rail, forming a left wall;
        a cross bar attached to the pillars attached to each end of the right rail, connecting the pillars mounted at each end of the right rail, forming a right wall;
        at least one bow attached to the cross bar forming the right wall and the bow attached to the cross bar forming the left wall, connecting the left wall and the right wall;
        a front support structure extending the support structure to a front compartment of the SUV; and
        wherein the support structure and the front support structure are designed to increase an interior volume of the SUV enabling the use of a large roll cage.

2. The device of claim 1, wherein the left rail and the right rail include a set of mounting holes that are used to mate the support structure to the SUV.

3. The device of claim 1, wherein the left rail and the right rail are designed in such a way as to allow the support structure to mount to the SUV using a set of existing mounting holes provided in the SUV.

4. The device of claim 1, wherein, the left rail and the right rail include a mounting bracket that facilitate mounting to the SUV.

5. The device of claim 1, wherein the removable top cover includes a square window with sharp corners on a right side, a left side, and a rear panel of the removable top cover.

6. The device of claim 5, wherein the square window a clear or opaque material.

7. The device of claim 1, wherein the removable top cover is made with several panels attached together with zippers, straps and buckles designed to firmly secure the removable top cover to the support structure.

8. The device of claim 7, wherein the several panels and the zippers enable the removable top cover to change into several different configurations to meet different looks, functions, or weather conditions.

9. The device of claim 7, wherein the zippers are designed and attached to the several panels in a way to avoid 90 degree turns.

10. The device of claim 1, wherein the removable top cover is fabricated from a flexible fabric including nylon, vinyl, or leather.

11. The device of claim 1, wherein the bow provides the necessary strength to hold the support structure together and to support additional loads applied including allowing a roof rack to be attached through a set of top corners of the removable top cover.

12. The device of claim 1, wherein the left rail, the right rail, the pillars, and the bow are fabricated from a metal or another high strength material including a carbon fiber.

13. The device of claim 1, wherein the support structure and the front support structure are shaped to extend beyond an original roofline of the SUV.

14. The device of claim 1, wherein the pillars are designed to extend outside of a side of the SUV to provide a substantially vertical wall.

15. The device of claim 1, wherein a front side panel gradually goes from vertical to slanted to follow a shape of a door of the SUV.

16. The device of claim 1, wherein a front portion of the removable top cover and a rear portion of the removable top cover zip apart.

* * * * *